United States Patent
Bastin

(10) Patent No.: US 11,326,068 B2
(45) Date of Patent: May 10, 2022

(54) CARPET BACKING LAYER COMPOSITION

(71) Applicant: TARKETT GDL, Lentzweiler (LU)

(72) Inventor: Pierre Bastin, Wiltz (LU)

(73) Assignee: TARKETT GDL, Lentzweiler (LU)

(*) Notice: Subject to any disclaimer, the term of this patent is extended or adjusted under 35 U.S.C. 154(b) by 302 days.

(21) Appl. No.: 16/630,763

(22) PCT Filed: Jul. 3, 2018

(86) PCT No.: PCT/EP2018/067966
§ 371 (c)(1),
(2) Date: Jan. 13, 2020

(87) PCT Pub. No.: WO2019/011725
PCT Pub. Date: Jan. 17, 2019

(65) Prior Publication Data
US 2020/0181440 A1  Jun. 11, 2020

(30) Foreign Application Priority Data

Jul. 14, 2017  (LU) .......................... 100340
Aug. 1, 2017  (LU) .......................... 100355
Mar. 19, 2018  (LU) .......................... 100738

(51) Int. Cl.
C09D 123/16  (2006.01)
C09D 7/40  (2018.01)
C09D 7/61  (2018.01)
A47G 27/02  (2006.01)
C09D 123/08  (2006.01)
C09D 123/20  (2006.01)
D06N 7/00  (2006.01)

(52) U.S. Cl.
CPC .......... C09D 123/16 (2013.01); A47G 27/02 (2013.01); C09D 7/61 (2018.01); C09D 7/69 (2018.01); C09D 123/0815 (2013.01); C09D 123/20 (2013.01); D06N 7/0076 (2013.01); D06N 2203/042 (2013.01); D06N 2205/06 (2013.01)

(58) Field of Classification Search
CPC .......... C09D 123/16; C09D 7/61; C09D 7/69; C09D 123/0815; C09D 123/20; D06N 7/0076; D06N 2203/042; D06N 2205/06; D06N 7/00; A47G 27/02
See application file for complete search history.

(56) References Cited

U.S. PATENT DOCUMENTS 4,211,852 A  *  7/1980  Matsuda .................. C08L 23/10
                                                     428/219
5,416,151 A  *  5/1995  Tanaka .................... C08K 3/013
                                                     524/484
5,468,807 A  *  11/1995  Tsurutani ................ C08L 23/10
                                                     525/240
6,281,288 B1 *  8/2001  Bickert .................... C08L 23/10
                                                     525/72
7,741,397 B2     6/2010  Liang et al.
2002/0039636 A1 *  4/2002  Fink ........................ D05C 17/02
                                                     428/85
2004/0052952 A1    3/2004  Vey et al.
2008/0280093 A1   11/2008  Bieser et al.
2010/0285246 A1   11/2010  Becker et al.
2014/0017439 A1    1/2014  Siskovich et al.
2016/0032521 A1    2/2016  Arvidson
2016/0102429 A1    4/2016  Uhl et al.
2021/0347997 A1 * 11/2021  Walia ..................... C09D 5/002

FOREIGN PATENT DOCUMENTS

EP  0518014 A1  12/1992
GB  2386902 A  * 10/2003
JP  H05 132870 A  5/1993
JP  H10 276888 A  10/1998
JP  3030124 B2  4/2000
LU  100355 B1  * 2/2019
LU  100738  * 10/2019
WO  2015/100073 A1  7/2015
WO  2020127298  * 6/2020

OTHER PUBLICATIONS

"Standardization of PCM Characterization via DSC" (Stefan Gschwander, Thomas Haussmann, Georg Hagelstein, Aran Sole) May 28, 2015 (https://www.researchgate.net/publication/277308186_Standardization_of_PCM_Characterization_via_DSC).*
International Search Report and Written Opinion dated Sep. 17, 2018, for International Application No. PCT/EP2018/067966 (9 pages).

* cited by examiner

Primary Examiner — Kevin R Kruer
(74) Attorney, Agent, or Firm — Fitch, Even, Tabin & Flannery LLP

(57) ABSTRACT

The present invention relates to a carpet backing layer composition, comprising: —100 parts by weight of a polyolefins or a blend of polyolefins and optionally a blend of oils, wax and tackifiers, said polyolefin or polyolefin blend comprising at least 0% by weight of (co)polymerized C3-C8 alfa-olefins—between 100 and 900 parts by weight of one or more inorganic filler(s) characterized by a volume median particle diameter (D50) comprised between 10 and 1000 µm; —the backing layer composition having a heat of fusion within the temperature range of from 10 to 40° C. ($\Delta H^{10 \rightarrow 40° C.}$) that is less than 12.5% of the heat of fusion of the backing layer within the temperature range of from 10 to 170° C. ($\Delta H^{10 \rightarrow 170° C.}$), the heat of fusion being measured by Differential Scanning calorimetry. The invention further relates to a carpet comprising a carpet backing layer obtained from the carpet backing layer composition and a method for the preparation of the carpet.

14 Claims, No Drawings

CARPET BACKING LAYER COMPOSITION

FIELD OF THE INVENTION

The present invention relates to a composition for carpet backing, in particular to a composition comprising a polyolefin and a filler. The present invention also relates to a carpet comprising the carpet backing composition and to a method for making the carpet comprising the carpet backing composition.

BACKGROUND OF THE INVENTION

Most conventional carpets comprise a primary backing layer with fiber tufts in the form of cut or uncut loops extending upwardly from the primary backing layer and a secondary backing layer at the backside of the primary backing layer.

US2004/0052952 discloses a process for tuft and filament binding to an unfinished carpet, which comprises applying a coating composition which comprises from 50% to 100% by weight of one or more substantially amorphous poly-alpha-olefins as a melt to the backside of the unfinished carpet in a coating weight amount of from 20 to 1,500 g/m$^2$ to bind the tuft and filament to the unfinished carpet, wherein the melt viscosity of the coating composition at 190° C. is from 200 mPas to 20,000 mPas.

The poly-alpha-olefin comprises polymerized monomer units of from 0% to 100% by weight of one or more alpha-olefins having 4 to 10 carbon atoms, from 0% to 100% by weight of propene and from 0% to 20% by weight of ethene.

The coating composition further comprises one or more of from 0% to 5% by weight of a crystalline polyolefin, from 0% to 35% by weight of fillers or pigments, and from 0% to 15% by weight of a wax.

US 2008/0280093 discloses a carpet comprising:
a primary backing material;
a plurality of fibers attached to the primary backing material; and
an adhesive composition, wherein the adhesive composition comprises at least one homogenously branched ethylene polymer characterized as having a short chain branching distribution index of greater than or equal to 50%, and a filler in an amount comprised between 1 and 75 weight percent of the composition, wherein the adhesive composition has substantially penetrated and substantially consolidated the fibers.

Preferably the ethylene polymers are substantially amorphous or totally amorphous. Representative examples of fillers include, but are not limited limestone (primarily CaCO3), marble, quartz, silica, and barite (primarily BaSO4). Suitable particle sizes range from about 1 to about 50 µm.

JPH05132870 discloses a resin composition for backing tile carpets, obtained by blending:
100 parts by weight resin component composed of (A) 50-90% by weight amorphous polyolefin and (B) 10-50% by weight tackifier (e.g. natural rosin or a modified rosin) with (C) 0-30 parts by weight of crystalline polypropylene and
25-900 parts by weight filler containing magnesium carbonate.

The particle size of MgCO$_3$ filler is between 1 and 500µ, preferably between 10 and 300 µm. The polyolefin can be a random copolymer of ethylene and propylene, wherein the ethylene content is between 0 and 30% by weight.

US 2014/0017439 describes carpets comprising:
a primary backing layer having a face side and a back side;
a plurality of fibers attached to the primary backing layer; and
a second layer attached to the back side of the primary backing layer, comprising at least one propylene-based elastomer, with limited crystallinity, comprising at least about 60% by weight propylene-derived units and about 5 to about 25% by weight ethylene-derived units.

The backing layers may include up to 80% by weight, based on the total weight of the layer, of organic and/or inorganic fillers. Suitable fillers are calcium carbonate, aluminum trihydrate, talc, among others.

U.S. Pat. No. 7,741,397 discloses a polymer composition comprising an ethylene/alpha-olefin interpolymer and a filler. The ethylene/alpha-olefin interpolymer is a block copolymer having a certain amount of crystallinity, and the filler, with a particle size preferably comprised between 3.2 and 8 µm, is present in the polymer composition in an amount comprised between 30 and 95%. The polymer composition can be used in automotive flooring applications.

US 2010/0285246 discloses a polyolefin for floor coverings, wherein the polyolefin contains not more than 20% by weight of ethylene, either 70-100% by weight or not more than 20% by weight of propylene and/or either 70-100% by weight or not more than 20% by weight of 1-butene or of another linear 1-olefin, with the sum of the proportions being 100% by weight, and the triad distribution for propene triads determined by 13C-NMR has an isotactic proportion of 75-98% by weight, an atactic proportion of less than 20% by weight and a syndiotactic proportion of not more than 20% by weight and/or the triad distribution for 1-butene triads determined by 13C-NMR has an isotactic proportion of 10-98% by weight, an atactic proportion of 1-85% by weight and a syndiotactic proportion of not more than 20% by weight.

The polyolefin may be mixed with not more than 80% by weight of inorganic and/or organic, based on a hot melt formulation comprising polyolefin and filler.

WO2015/100073 discloses a carpet comprising:
(a) a primary backing layer;
(b) a plurality of fibers attached to the primary backing layer; and
(c) a second layer attached to the back side of the primary backing layer, wherein at least one of the primary backing layer and the second layer comprises a polymer blend comprising:
(i) a first propylene-based polymer, wherein the first propylene-based polymer is a homopolymer of propylene or a copolymer of propylene and ethylene or a C4 to C10 alpha-olefin; and
(ii) a second propylene-based polymer, wherein the second propylene-based polymer is a homopolymer of propylene or a copolymer of propylene and ethylene or a C4 to C10 alpha-olefin; wherein the second propylene-based polymer is different than the first propylene-based polymer;
wherein the polymer blend has a melt viscosity, measured at 190° C., according to ASTM D-3236, of about 500 to about 25,000 cP. Any one of the layers can comprise a filler and/or additive. The filler may be present at up to about 80% by weight, based on the total weight of the layer. The polymer blend may have a heat of fusion comprised between 5 J/g and less than 90 J/g and a crystallization temperature of greater than 0° C. and less than 110° C.

US 2016/0102429 discloses a carpet backing composition comprising:
  (a) 10 to 50% by weight of a first polymer component, the first polymer component comprising an elastomeric polymer;
  (b) 50 to 90% by weight of a filler; and
  (c) 0.1 to 5% by weight of a compatibilizer, the compatibilizer providing free radical source to bond the first polymer component and the filler.

The filler comprises fly ash, ground glass, calcium carbonate, talc, clay, or combinations thereof. The first polymer component is a propylene-based copolymer having:
  75 to 95% by weight propylene-derived units and about 5 to 25% by weight units derived from at least one of ethylene or a C4 to C12 alpha-olefin;
  a heat of fusion, as determined by DSC, of about 75 J/g or less;
  a percent crystallinity of 2 to 65.

The composition may further comprise a second polymer component. The second polymer component can be a homopolymer, such as a functionalized/modified homo-polymer, a copolymer, such as a functionalized/modified copolymer, an oligomer, a hydrocarbon tackifying resin, such as a functionalized/modified hydrocarbon tackifying resin, or any combinations thereof.

Carpets, during their use, are subject to atmospheric fluctuations such as changes in ambient temperature and humidity, which endanger their dimensional stability. To remedy to the dimensional instability and to prevent curling, a flexible backing is indispensable; yet it is generally known that the flexibility of the polymer(s), forming the backing layer, is negatively influenced by the addition of filler and additives. Fillers are added to the formulation both for economical and performance reasons e.g. fire resistance.

The negative effect of filler on the flexibility of a polyolefin/filler blend, depends on the particle size of said filler and is proportional to it. Otherwise, low particle size fillers negatively influence processing of the blend since they give rise to local overheating of the polyolefin causing degradation of the polymer resulting, dependent on the polymer composition, in either an increase in viscosity due to peroxide-initiated crosslinking or a loss in physical properties of the backing layer due to chain scission.

In particular, polymers containing high levels (more than 50% in weight) of ethene are subject to a viscosity increase during high temperature processing due to crosslinking degradation, causing poor processing performances especially for high filled compounds. Contrary, polymers containing high level of C3 to C8 monomers have no tendency to crosslink during hot processing. In addition, high amounts of low particle size filler negatively influence the adhesion of the backing layer to the unfinished carpet.

AIMS OF THE INVENTION

The present invention aims at providing a carpet backing layer that does not present the drawbacks of the prior art carpet backing layers. In a further aspect, it is an aim of the present invention to provide a carpet backing layer allowing the production of carpets showing a dimensional stability independent of atmospheric conditions, the carpet backing layer being applicable by a trouble-free process. An aim of a further aspect of the invention is to provide a method for the production of carpets, comprising the carpet backing layer as well as the carpet itself.

SUMMARY OF THE INVENTION

According to a first aspect, the present invention relates to a carpet backing layer composition comprising:

between at least 10% by weight and 50% by weight or less, preferably 40% by weight or less, more preferably 30% by weight or less, most preferably 20% by weight or less of a semi-crystalline polyolefin or of a blend of two or more semi-crystalline polyolefin(s) said polyolefin or blend of two or more polyolefins being characterized in that the weight percentage of (co)polymerized C2 olefin is less than 50 and that the weight percentage of C3-C8 alfa olefins is 50 or more; and between up to 90% by weight and 50% by weight or more, preferably 60% by weight or more, more preferably 70% by weight or more, most preferably 80% by weight or more of one or more inorganic filler(s) characterized by a volume median particle diameter (D50) comprised between up to 1000 µm and at least 10 µm, preferably more than 20 µm, more preferably more than 50 µm and most preferably more than 100 µm, or even more than 200 µm as obtained from laser light scattering measurements according to ISO 13320;

the backing layer composition being characterized in that the heat of fusion within the temperature range of from 10 to 40° C. ($\Delta H^{10 \rightarrow 40° \ C.}$) is less than 12.5%, preferably less than 10%, more preferably less than 5% of the heat of fusion within the temperature range of from 10 to 170° C. ($\Delta H^{10 \rightarrow 170° \ C.}$) the heat of fusion being measured by Differential Scanning calorimetry.

Preferred embodiments of the present invention disclose one or more of the following features:
  the polyolefin or blend of polyolefins has a Shore A hardness, according to ASTM D 2240 of at least 65, preferably of at least 70, more preferably of at least 75, most preferably of at least 80, even of at least 85 or even of at least 90;
  the C3-C8 alpha-olefin(s) of the one or more polyolefin(s) are selected from the group consisting of the isomers of C3 to C8 alpha-olefins and combinations thereof;
  the C3-C8 alpha-olefin of the one or more polyolefin(s) is propene, 1-butene, 1-octene or a combination thereof;
  the polyolefin is selected from the group consisting of polypropylene, poly-1-butene, propene-ethene copolymer, propene-1-butene copolymer, 1-butene-ethene copolymer, propene-1-butene-ethene copolymer and 1-octene-ethene copolymer;
  the inorganic filler is selected from the group consisting of talc, mica, calcium carbonate, magnesium carbonate, dolomite, barite (barium sulfate), bauxite, magnesium hydroxide, aluminium hydroxide, kaolin, silica, glass, and any combination thereof;
  the carpet backing layer composition comprises one or more processing additive(s) selected from the group consisting of waxes, oils and tackifiers;
  the carpet backing layer composition comprises:
    between at least 10% by weight and 50% by weight or less, preferably 40% by weight or less, more preferably 30% by weight or less, most preferably 20% by weight or less of I, preferably of II, more preferably of III, most preferably of IV; and
    between up to 90% by weight and 50% by weight or more, preferably 60% by weight or more, more preferably 70% by weight or more, most preferably 80% by weight or more of one or more inorganic filler(s) characterized by a volume median particle diameter (D50) comprised between up to 1000 µm and at least 10 µm, preferably more than 20 µm, more preferably more than 50 µm and most preferably more than 100 μm, or even more than 200 μm as obtained from laser light scattering measurements according to ISO 13320;
wherein:
I. comprises 20% by weight or more of one or more polyolefin(s) and 80% by weight or less of one or more processing additive(s);
II. comprises 25% by weight or more of one or more polyolefin(s) and 75% by weight or less of one or more processing additive(s);
III. comprises 35% by weight or more of one or more polyolefin(s) and 65% by weight or less of one or more processing additive(s);
IV. comprises 45% by weight or more of one or more polyolefin(s) and 55% by weight or less of one or more processing additive(s);
the carpet backing layer composition comprises:
between at least 10% by weight and 50% by weight or less, preferably 40% by weight or less, more preferably 30% by weight or less, most preferably 20% by weight or less of V, preferably of VI, more preferably of VII; and
between up to 90% by weight and 50% by weight or more, preferably 60% by weight or more, more preferably 70% by weight or more, most preferably 80% by weight or more of one or more inorganic filler(s) characterized by a volume median particle diameter (D50) comprised between up to 1000 μm and at least 10 μm, preferably more than 20 μm, more preferably more than 50 μm and most preferably more than 100 μm, or even more than 200 μm as obtained from laser light scattering measurements according to ISO 13320.
wherein:
V. comprises 55% by weight or more of one or more polyolefin(s) and 45% by weight or less of or more processing additive(s);
VI. comprises 65% by weight or more of one or more polyolefin(s) and 35% by weight or less of one or more processing additive(s);
VII. comprises 80% by weight or more of one or more polyolefin(s) and 20% by weight or less of one or more processing additive(s);
the carpet backing layer composition is characterized by a melt viscosity at 160° C. in a rotational viscometer, according to ISO 11443, of from 10 Pas to 5000 Pas, preferably from 20 Pas to 2500 Pas, more preferably from 50 to 500 Pas.

In a further aspect, the present invention relates to a carpet comprising a carpet backing layer comprising the carpet backing layer composition of the present invention.

Preferred characteristics of the carpet according to the present invention comprise:
the backing layer has a surface density comprised between 1600 and 4000 g/m$^2$, preferably between 1700 and 3500 g/m$^2$, more preferably between 1800 and 3000 g/m$^2$, most preferably between 1900 and 2500 g/m$^2$ and
the backing layer thickness is comprised between 0.4 and 4.0 mm, preferably between 0.5 and 3.5 mm, more preferably between 0.7 and 2.5 mm, most preferably between 0.8 and 2.0 mm.

The present invention further discloses a method of making a carpet comprising:
a) extrusion coating the carpet backing layer composition of the present, on the back side of a primary backing material, said primary backing material having a face and a back side, a plurality of fibers attached to the primary backing material and extending from the face side and exposed at the back side and
b) cooling down the carpet layer composition and forming the carpet backing layer.

Preferred embodiments of the method of making a carpet further disclose:
the extrusion coating is performed at a temperature comprised between 130 and 170° C., preferably between 140 and 160° C.
an additional step comprises subjecting the extrusion coated carpet backing layer composition of step a) to a subsequent heat treatment at a temperature comprised between 130 and 170° C., preferably between 140 and 160° C. for a time period comprised between 1 and 60 s, preferably between 5 and 30 s, more preferably between 10 and 20 s, before cooling down in step b).

DETAILED DESCRIPTION OF THE INVENTION

According to the present invention there is provided a carpet backing layer for carpet tiles and carpet rolls, showing an outstanding dimensional stability, independent of the ambient conditions, said carpet backing layer being obtained from a semi-crystalline polyolefin or a blend of semi-crystalline polyolefins, one or more filler(s) and optionally of one or more compounds selected from the group consisting of waxes, oils, tackifiers and combinations thereof.

The polyolefin(s) for being used in the carpet backing layer of the present invention are obtained from polymerizing one or more C2 to C8 olefin.

In the case where one polyolefin is used, said polyolefin comprises 50% by weight or more of (co)polymerized C3 to C8 alpha olefins.

In the case of using a blend of polyolefins, one or more of said polyolefins may comprise less than 50% by weight of (co)polymerized C3-C8 alpha-olefins, provided that the blend of polyolefins comprises 50% by weight or more of C3-C8 alpha-olefins.

The (co)polymerized C3 to C8 alpha olefins are preferably selected from the group consisting of propene, 1-butene, 1-pentene, 1-hexene, 1-heptene, and 1-octene.

Alpha-olefins selected from the group consisting of iso-pentene, 3,3-dimethyl-1-butene, 3,3-dimethyl-1-pentene, 3,4-dimethyl-1-pentene, 3-ethyl-1-pentene, 3-methyl-1-hexene, 4,4-dimethyl-1-pentene, 4-methyl-1-hexene, 5-methyl-1-hexene, 3-methyl-1-heptene, 4-methyl-1-heptene, 5-methyl-1-heptene, 6-methyl-1-heptene, 3.3-dimethyl-1-hexene, 4,4-dimethyl-hexene, 5,5-dimethyl-1-hexene, 3,4-dimethyl-1-hexene, 3,5-dimethyl-1-hexene, 4,5-dimethyl-1-hexene, 3-ethyl-1-hexene, 4-ethyl-1-hexene, 5-ethyl-1-hexene, 3-methyl-4-ethyl-1-pentene, 3-ethyl-4-methyl-1-pentene and 3-methyl-3-ethyl-1-pentene are optionally used.

Preferably the C3 to C8 alpha-olefin is propene, 1-butene, 1-octene or a combination thereof.

Preferably the polyolefin is a polypropylene homopolymer or a propylene based copolymer.

Preferably the polyolefin is a polybutylene-1 homopolymer or a 1-butene based copolymer; more preferably the polyolefin is a 1-butene based copolymer.

The propylene-based copolymer comprises 50% by weight or more, preferably 60% by weight or more, more preferably 70% by weight or more, most preferably 80% by weight or more or even 90% by weight or more of propylene-derived units, based on the total weight of the propylene-based copolymer. Correspondingly, the units derived from at least one of ethylene or a C4 to C8 alpha-olefin may be present in an amount of less than 50% by weight, preferably of less than 40% by weight, more preferably of less than 30% by weight, most preferably of less than 20% by weight or even of less than 10% by weight based on the weight of the propylene-based copolymer.

The 1-butene-based copolymer comprises 50% by weight or more, preferably 60% by weight or more, more preferably 70% by weight or more, most preferably 80% by weight or more of 1-butene-derived units, based on the total weight of the 1-butene-based copolymer. Correspondingly, the units derived from at least one of ethylene, propylene or a C5 to C8 alpha-olefin may be present in an amount of less than 50% by weight, preferably of less than 40% by weight, more preferably of less than 30% by weight, most preferably of less than 20% by weight based on the weight of the 1-butene-based copolymer. Preferably the 1-butene-based copolymer comprises less than 85% by weight of polymerized 1-butene and 15% by weight or more of polymerized propene and/or ethene, the weight percentage of ethene being under 50.

Preferably the polyolefin is selected from the group consisting of polypropylene, propene-ethene copolymer, propene-1-butene copolymer, 1-butene-ethene copolymer propene-1-butene-ethene copolymer and 1-octene-ethene copolymer.

Preferably the polyolefin comprises less than 50% by weight of polymerized ethene.

In the case of using a blend of polyolefins, one or more of said polyolefins may comprise more than 50% by weight of (co)polymerized ethene, provided that the blend of polyolefins comprises less than 50% by weight of ethene.

The polyolefin or polyolefin blend is a semi-crystalline polyolefin or polyolefin blend characterized by:
  a heat of fusion ($\Delta H_f$) of 75 J/g or less, preferably of 70 J/g or less, more preferably 50 J/g or less, most preferably 45 J/g or less or even 35 J/g or less and of more than 10 J/g, preferably of more than 20 J/g, more preferably of more than 25 J/g;
  a melting peak temperature comprised between 20 and 160° C., preferably between 30 and 150° C., more preferably between 40 and 140° C.;
the heat of fusion ($\Delta H_f$) and the melting peak temperature being determined by Differential Scanning calorimetry (DSC) with a heating gradient of 10° C./minute. The melting peak temperature is determined at the peak in the DSC curve. For the determination of the heat of fusion ($\Delta H_f$) and the melting peak temperature, samples of the polyolefin or polyolefin blend are first stored for 48 hours at a temperature of 14° C. and subsequently are cooled down, at gradient of 10° C./minute, to a temperature of 0° C. After 5 minutes at 0° C. the samples are heated, at a heating gradient of 10° C./minute for recording the DSC curve.
  The polyolefin further is preferably characterized by:
  a number average molecular weight (Mn) comprised between 2,500 and 250,000 g/mole, preferably between 10,000 and 250,000 g/mole, more preferably between 25,000 and 200,000 g/mole;
  a polydispersity (DP) comprised between 1.5 and 20, preferably between 1.5 and 15, more preferably between 1.5 and 5, most preferably between 1.8 to about 3, or even between 1.8 to about 2.5;
as determined by Gel Permeation Chromatography in 1,2,4-trichlorobenzene, against polystyrene standards.

Preferably the polyolefin or blend of polyolefin is further characterized by a Shore A hardness, according to ASTM D 2240, of at least 65, preferably of at least 70, more preferably of at least 75, most preferably of at least 80, even of at least 85 or even of at least 90.

To the one or more polyolefin(s) is/are optionally blended:
  tackifiers comprising at least one hydrocarbon, wherein the hydrocarbon comprises an aliphatic hydrocarbon, a cycloaliphatic hydrocarbon, an aromatic modified aliphatic hydrocarbon, an aromatic and aliphatic hydrocarbon modified with at least one fatty acid ester or any combination thereof. Commercially available examples of the hydrocarbon tackifier include, e.g., Escorez™ (Escorez 1102 and 5600) (ExxonMobil Corp.), and Struktol™ TR016 (Struktol Company of America); and/or Regalite (Regalite 1090) from Eastmann Tackifiers could be hydrotreated or not;
  waxes selected from microcrystalline waxes, polyethylene waxes, Fischer-Tropsch waxes, paraffin waxes, polypropylene waxes or combinations thereof. Preferably microcrystalline waxes and/or polypropylene waxes may be used. Commercially available waxes include but are not limited to Sasolwax® C80 (Sasol) and A-C® 1660 (Honeywell); and/or Microcrystalline Wax LMP, or Microcriytalline Wax HMP from Shell; and/or MMP Wax from Alpha
  oils, for example oils selected from vegetable and derivatized vegetable oils, hydrotreated heavy naphthenic petroleum oils, paraffinic oils or combinations thereof may be used. Commercially available examples of naphthenic oils are KN 4006 and KN 4008 (KunLun Lubricant Company of Petrochina) and LP 150 and LP 350 (Kukdong Oil and Chemicals) and/or Finavestan 360 B from Total and/or processing oil 6116 WOP from PetroCenter. Preferably, oils are based on paraffinic hydrotreated to minimize the smell of the compound.

To the one or more polyolefin(s), optionally comprising one or more oil(s) and/or one or more wax(es) and/or one or more tackifier(s), are added one or more fillers selected from the group consisting coal fly ash, carbonate salts such as magnesium carbonate, calcium carbonate and calcium-magnesium carbonate, barium sulfate, carbon black, metal oxides, inorganic material, natural material, alumina trihydrate, magnesium hydroxide, aluminum hydroxide, bauxite, talc, mica, barite, kaolin, silica, post-consumer glass, or post-industrial glass, synthetic and natural fiber, or any combination thereof. Preferably, the filler comprises talc, mica, calcium carbonate, barite, kaolin, silica, glass, or any combination thereof.

The one or more fillers are characterized by a volume median particle diameter (D50) comprised between up to 1000 μm and more than 10 μm, preferably more than 20 μm, more preferably more than 50 μm and most preferably more than 100 μm or even more than 200 μm as obtained from laser light scattering measurements according to ISO 13320.

The technique of laser diffraction is based on the principle that particles passing through a laser beam will scatter light at an angle that is directly related to their size: large particles scatter at low angles, whereas small particles scatter at high angles. The laser diffraction is accurately described by the Fraunhofer approximation and the Mie theory, with the assumption of spherical particle morphology.

Concentrated suspensions, comprising about 1.0% by weight of filler particles, are prepared, using suitable wetting and/or dispersing agents. Suitable solvents are for example water or organic solvents such as for example ethanol, isopropanol, octane or methyl ethyl ketone. A sample presentation system ensures that the material under test passes through the laser beam as a homogeneous stream of particles in a known, reproducible state of dispersion.

Typically the particle size distribution is measured by laser light scattering using the particle size analyzer (HORIBA 920) from (Horiba Scientific) according to ISO 13320.

Particle size measurements are performed on pure solvent, e.g. 150 ml of methyl ethyl ketone, to which a concentrated suspension of filler is added drop by drop until the concentration of filler is such that a transmission, as displayed by the particle size analyzer is comprised between 75 and 90%.

The carpet backing layer of the present invention thus comprises a composition comprising:
- between at least 10% by weight and 50% by weight or less, preferably 40% by weight or less, more preferably 30% by weight or less of a semi-crystalline polyolefin or of a blend of two or more semi-crystalline polyolefin(s) characterized in that the polyolefin or blend of polyolefins has a weight percentage of (co)polymerized C3-C8 alfa-olefins of 50 or more;
- between up to 90% by weight and 50% by weight or more, preferably 60% by weight or more, more preferably 70% by weight or more of one or more inorganic filler(s) characterized by a volume median particle diameter (D50) comprised between up to 1000 µm and more than 10 µm, preferably more than 20 µm, more preferably more than 50 µm and most preferably more than 100 µm, or even more than 200 µm as obtained from laser light scattering measurements according to ISO 13320.

the backing layer composition being characterized in that the heat of fusion within the temperature range of from 10 to 40° C. ($\Delta H^{10 \to 40° C.}$) is less than 12.5%, preferably less than 10%, more preferably less than 5% of the heat of fusion within the temperature range of from 10 to 170° C. ($\Delta H^{10 \to 170° C.}$) the heat of fusion being measured by Differential Scanning calorimetry.

For the determination of the percentage of the heat of fusion, samples of the backing layer composition, after being compounded, are first stored for 48 hours at a temperature of 14° C. and subsequently are cooled down, at gradient of 10° C./minute, to a temperature of 0° C. After 5 minutes at 0° C. the heat of fusion is determined by heating the samples, at a heating gradient of 10° C./minute, to a temperature of 170° C. The heat of fusion within the temperature range of from 10 to 40° C. ($\Delta H^{10 \to 40° C.}$) is determined from integrating the heat flux in said temperature range.

The carpet backing layer further may comprise one or more wax(es), oil(s) and/or tackifier(s), substituting 80% by weight or less, advantageously 75% by weight or less, advantageously 65% by weight or less, advantageously 55% by weight or less, advantageously 45% by weight or less, advantageously 35% by weight or less, advantageously 20% by weight or less, of the semi-crystalline polyolefin or of the blend of semi-crystalline polyolefins, the polyolefin part in the carpet backing formulation thus being transformed into:
- 20% by weight or more of one or more polyolefin(s) and 80% by weight or less or more or more wax(es), oil(s) and/or tackifier(s) (mixture or blend I);
- 25% by weight or more of one or more polyolefin(s) and 75% by weight or less or more or more wax(es), oil(s) and/or tackifier(s) (mixture or blend II);
- 35% by weight or more of one or more polyolefin(s) and 65% by weight or less or more or more wax(es), oil(s) and/or tackifier(s) (mixture or blend III)
- 45% by weight or more of one or more polyolefin(s) and 55% by weight or less or more or more wax(es), oil(s) and/or tackifier(s) (mixture or blend IV);
- 55% by weight or more of one or more polyolefin(s) and 45% by weight or less or more or more wax(es), oil(s) and/or tackifier(s) (mixture or blend V);
- 65% by weight or more of one or more polyolefin(s) and 35% by weight or less or more or more wax(es), oil(s) and/or tackifier(s) (mixture or blend VI);
- 80% by weight or more of one or more polyolefin(s) and 20% by weight or less or more or more wax(es), oil(s) and/or tackifier(s) (mixture or blend VII).

For this particular case the carpet backing composition comprises a composition comprising:
- between at least 10% by weight and 50% by weight or less, preferably 40% by weight or less, more preferably 30% by weight or less of a mixture or an blend of I, II, III, IV, V, VI or VII;
- between up to 90% by weight and 50% by weight or more, preferably 60% by weight or more, more preferably 70% by weight or more of one or more inorganic filler(s).

The inventors have observed that the heat of fusion of each composing component of the carpet backing composition is influenced to a certain degree by the other composing components, yet the thermal properties of the complete carpet backing composition is determining for the dimensional stability of the derived carpet backing layer and thus for finished carpet.

When tackifiers are used in the carpet baking composition of the present invention they preferably are used in combination with one or more oil(s) and/or with one or more waxe(s). The inventors have observed that the use of tackifiers as such (=without oil(s) and/or waxe(s)) has a negative effect on the dimensional stability of derived carpet backing layer.

The inventors have observed as well that the use of wax as the only partial substitute for the polyolefin or polyolefin blend may have a negative effect on the dimensional stability of derived carpet backing layer.

The inventors have also observed that for a polyolefin or a polyolefin blend characterized by a borderline Shore hardness (65-70) and a borderline heat of fusion ($\Delta H_f$ around 25 J/g), waxe(s), oil(s) and tackifier(s) preferably are omitted in the carpet backing composition.

The inventors have found that:
- the weight percentage of (co)polymerized C3-C8 alpha-olefin in the polyolefin(s);
- the weight percentage and particle size of the filler(s)
- and the type and weight percentage of waxe(s), oil(s) and/or tackifier(s);

are key for the value of the heat of fusion of the backing layer composition in the temperature range of from 10 to 40° C. ($\Delta H^{10 \to 40° C.}$) relative to the value of the heat of fusion in the temperature range of from 10 to 170° C. ($\Delta H^{10 \to 170° C.}$); a relative value of less than 12.5% in turn being the main determining characteristic for:
- getting the right yield strength of the carpet backing layer resulting in a carpet characterized by a satisfactory handling and dimensional stability;
- limiting thermal degradation of the polyolefin(s) to a strict minimum;
- good dimensional stability;
- guaranteeing good adhesion of the backing layer composition to the unfinished carpet.

The inventors have experienced personally that a limited number of experiments allow the one skilled in the art to obtain the right combination of polyolefin(s), filler(s), wax (es), oil(s) and tackifier(s) that results in a backing layer composition with a heat of fusion, in the temperature range of from 10 to 40° C. ($\Delta H^{10 \to 40° C.}$), of less than 12.5%, or even less than 10% or even less than 5%, of the heat of fusion in the temperature range of from 10 to 170° C. ($\Delta H^{10 \to 170° C.}$), ensuring a long term dimensional stability of the derived carpet tiles.

The composition according to the present invention can optionally contain one or more further additives, such as, antimicrobial, biocides, antioxidants, thermal stabilizers, flame retardants, or any combination thereof. Preferably, the composition includes at least a flame retardant, a thermal stabilizer or a combination thereof.

A stabilizer can for example be added to the composition to provide heat stability. The stabilizer can be used to minimize degradation caused by exposure to heat and oxygen, including conditions encountered in the manufacture of a product containing the composition of the present invention.

Particularly preferred stabilizers are for example sterically hindred phenolic antioxidants such as Irganox 1010 and Irganox 1076 (BASF) and stabilizers from the phosphonite or phosphite type such as Doverphos® S-9228 (Dover Chem. Corp) or Weston® TNPP (Addivant).

Flame retardants preferably are selected from halogenated and non-halogenated flame retardants, zinc borates, aluminium hydroxides, magnesium hydroxide, bromium oxides and zinc hydroxides. Liquid flame retardants can also be used for instance phosphate plasticizers.

The composition according to the present invention optionally comprises between 0.1% and 5% of the one or more further additives.

The compositions according to the present invention are characterized by:
  a melt viscosity at 160° C. in a rotational viscometer, according to ISO 11443:2005, of from 10 Pas to 5000 Pas, preferably from 20 Pas to 2500 Pas, more preferably from 50 to 500 Pas;
  an open time of not more than 300 seconds, preferably not more than 200 seconds, more preferably not more than 150 seconds and most preferably not more than 120 seconds, with further preferred ranges being not more than 100 seconds, not more than 60 seconds, not more than 45 seconds, not more than 30 seconds, not more than 20 seconds, and in particular 1-30 seconds, wherein the open time stands for the period of time during which the composition is processable i.e. does not solidify or partially solidify, so that a potential blockage and contamination of the application equipment is circumvented.

The composition according to the present invention preferably is compounded in a suitable heated mixer, for example in a twin screw or a single screw extruder, at an internal temperature comprised between 130 and 170° C., preferable between 140 and 160° C. By internal temperature it is meant the real temperature of the melt and not the set temperatures of the equipment for preparing and processing of said melt.

The melt is applied, by extrusion coating, on the back side of a first backing material, said first backing material having a face and a back side, a plurality of fibers attached to the first backing material and extending from the face of the first backing material and exposed at the back side of the first backing material.

The melt blended composition, standing at a temperature comprised between 130 and 170° C., preferable between 140 and 160° C., is applied in the form of a thin film on the back side of the first backing material, forming the carpet backing layer upon cooling, with a layer thickness comprised between 0.4 and 4.0 mm, preferably between 0.6 and 3.0 mm, more preferably between 0.8 and 2.0 mm, corresponding to a surface density comprised between 1600 and 4000 g/m², preferably between 1700 and 3500 g/m², more preferably between 1800 and 3000 g/m², most preferably between 1900 and 2500 g/m².

The extrusion coated carpet backing layer composition optionally is subjected to a subsequent heat treatment at a temperature comprised between 130 and 170° C., preferably between 140 and 160° C. for a time period comprised between 1 and 60 s, preferably between 5 and 30 s, more preferably between 10 and 20 s, before cooling down.

The carpets may be produced and applied as tiles or as roles.

The carpets thus obtained prove satisfactory dimensional stability to prevent curling upon varying atmospheric temperature and humidity conditions.

EXAMPLES 1-26

The following illustrative examples are merely meant to exemplify the present invention but is not destined to limit or otherwise define the scope of the present invention.

In table 1 to 3 the influence of filler content, particle size of the filler and additive content on the $\Delta H^{10 \to 40° C.}$ heat of fusion percentage ($100 \times \Delta H^{10 \to 40° C.}/\Delta H^{10 \to 170° C.}$) of the carpet backing layer composition is illustrated. The amounts of polyolefins, additives and fillers are given in parts.

TABLE 1

| Example | Vestoplast 708 Shore A: 67 | Vestoplast 408 Shore A: 94 | Carbocia 310 | Additives | % weight Filler | $100 \times \Delta H^{10 \to 40° C.}/\Delta H^{10 \to 170° C.}$ |
|---|---|---|---|---|---|---|
| 1 |  | 100 | 100 |  | 50 | 0 |
| 2 |  | 80 | 100 | 20 | 50 | 8.5 |
| 3 | 100 |  | 200 |  | 67 | 3.5 |
| 4 |  | 65 | 300 | 35 | 75 | 5 |
| 5 | 65 |  | 400 | 35 | 80 | 11.2 |
| 6 |  | 65 | 400 | 35 | 80 | 5.3 |

TABLE 2

| Example | Vistamax 6502 Shore A: 71 | Vistamax 8880 Shore A: 93 | Licocene 1602 Shore A: 82 | Carbocia 310 | Additives | % weight Filler | $100 \times \Delta H^{10 \to 40° C.}/\Delta H^{10 \to 170° C.}$ |
|---|---|---|---|---|---|---|---|
| 7 | 100 |  |  | 200 |  | 67 | 5.3 |
| 8 |  |  | 100 | 200 |  | 67 | 7.3 |

TABLE 2-continued

| Example | Vistamax 6502 Shore A: 71 | Vistamax 8880 Shore A: 93 | Licocene 1602 Shore A: 82 | Carbocia 310 | Additives | % weight Filler | $100 \times \Delta H^{10 \to 40° C.}/\Delta H^{10 \to 170° C.}$ |
|---|---|---|---|---|---|---|---|
| 9 | 80 | | | 100 | 20 | 50 | 12.9 |
| 10 | | 80 | | 100 | 20 | 50 | 10.8 |

In table 2, example 9 is comparative because of the $(100 \times \Delta H^{10 \to 40° C.}/\Delta H^{10 \to 170° C.})$ value of the backing layer composition being above 12.5%.

In:

Example 2, 9 and 10, the additive is LMP wax, a microcrystalline hydrogenated microwax derived from the residues of the vacuum distillation of crude oil from Shell;

Example 4 to 6, the 35 parts of additives comprise 20 parts of tackifier, 5 parts of mineral oil and 10 parts of LMP wax, wherein the tackifier is Escorez 1102 or Escorez 5600 from ExxonMobil and the mineral oil is Processing oil 6116 WOP from PetroCenter.

Example 25, the 80 parts of additives comprise 25 parts of tackifier, 30 parts of oil and 25 parts of HMP Microcrystalline wax.

Example 26, the 17.25 parts of additives consist of tackifier only.

In tables 1 to 4:

Carbocia 310 is calcium carbonate with a volume median particle diameter (D50) of 200 μm;

Durcal 10 is calcium carbonate with a volume median particle diameter (D50) of 10 μm;

BL is calcium carbonate with a volume median particle diameter (D50) of 30 μm;

TABLE 3

| Example | Vestoplast 408 | Durcal 10 | BL | Omyacarb 130 GU | Carbocia 310 | Carbocia 1300 | % weight Filler | $100 \times \Delta H^{10 \to 40° C.}/\Delta H^{10 \to 170° C.}$ |
|---|---|---|---|---|---|---|---|---|
| 11 | 100 | 100 | | | | | 50 | 3 |
| 12 | 100 | 150 | | | | | 60 | 2.9 |
| 13 | 100 | | 100 | | | | 50 | 2.8 |
| 14 | 100 | | | 100 | | | 50 | 2.7 |
| 15 | 100 | | | | 100 | | 50 | 2.4 |
| 16 | 100 | | | | 150 | | 60 | 2.7 |
| 17 | 100 | | | | | 100 | 50 | 2.7 |
| 18 | 100 | | | | | 150 | 60 | 2.7 |

TABLE 4

| Example | Polyolefin 1 (parts) | Polyolefin 2 (parts) | Additives parts | Filler (parts) | % weight Filler | $100 \times \Delta H^{10 \to 40° C.}/\Delta H^{10 \to 170° C.}$ |
|---|---|---|---|---|---|---|
| 19 | Vestoplast 508 (20) | Vestoplast 408 (45) | 35 | Carbocia 310 (400) | 80 | 0 |
| 20 | Vestoplast 508 (20) | Vestoplast 408 (45) | 35 | Carbocia 310 (565) | 85 | 10.2 |
| 21 | Licocene 2602 (20) | Licocene 3602 (20) | 60 | Carbocia 310 (450) Baryte (450) | 90 | 4.9 |
| 22 | Vestoplast 408 (32.5) | Vistamax 8880 (32.5) | 35 | Carbocia 310 (400) | 80 | 6.9 |
| 23 | Engage 8100 (60) | Vistamax 8880 (40) | — | Carbocia 310 (200) | 67 | 0 |
| 24 | Engage 8100 (12.5) | Vistamax 8880 (12.5) | 75 | Carbocia 310 (300) | 75 | 8.7 |
| 25 | Engage 8100 (10) | Vistamax 8880 (10) | 80 | Carbocia 310 (300) | 75 | 4.05 |
| 26 | Vestoplast 708 41.375 | Vestoplast 508 41.375 | 17.25 | BL20 250 | 71.4 | 16.7 |

In:

Example 19, 20 and 22, the 35 parts of additives comprise 20 parts of tackifier, 5 parts of mineral oil and 10 parts of MMP wax from Alpha;

Example 21, the 60 parts of additives comprise 40 parts of tackifier, 10 parts of oil and 10 parts of MMP wax;

Example 24, the 75 parts of additives comprise 25 parts of tackifier, 25 parts of oil and 12.5 parts of HMP Microcrystalline wax from Shell and 12.5 parts of MMP wax from Alpha;

Omyacarb 130 GU is calcium carbonate with a volume median particle diameter (D50) of 150 μm;

Carbocia 1300 is a calcium carbonate with a volume median particle diameter (D50) of 650 μm;

Vestoplast 408 is a high 1-butene, propylene ethylene copolymer; having a Shore A at 94; a heat of fusion ($\Delta H_f$) of 0.76 J/g in the temperature range of from 33 to 49° C., with a peak at 41° C., and 40.86 J/g in the temperature range of from 72 to 115° C. with a peak at 104.8° C.

Vestoplast 508 is a high 1-butene, propylene ethylene copolymer; having a Shore A at 74; a heat of fusion ($\Delta H_f$) of 23.94 J/g in the temperature range of from 26 to 80° C. with a peak at 43° C.

Vestoplast 708 is a high 1-butene, propylene ethylene copolymer, having a Shore A at 67; a heat of fusion ($\Delta H_f$) of 24.9 J/g in the temperature range of from 29 to 117° C. with a peak at 42° C.

Vistamaxx 8880 is a metallocene propylene ethylene copolymer having a Shore A at 93; a heat of fusion ($\Delta H_f$) of 43.4 J/g in the temperature range of from 22 to 120° C. with a peak at 48 and at 89° C.

Vistamax 6502 is a metallocene propylene ethylene copolymer, having a Shore A at 71; a heat of fusion ($\Delta H_f$) of 25.82 J/g in the temperature range of from 27 to 110° C. with a peak at 45.9° C.

Licocene 1602 is a metallocene propylene ethylene copolymer having a Shore A at 82; a heat of fusion ($\Delta H_f$) of 34.08 J/g in the temperature range of from 30 to 95° C. with a peak at 55 and at 72.3° C.).

Licocene 2602 is a metallocene propylene ethylene copolymer, having a Shore A at 90; a heat of fusion ($\Delta H_f$) of 76.3 J/g in the temperature range of from 24 to 102° C. with a peak at 43 and at 83° C.

Licocene 3602 is a metallocene propylene ethylene copolymer, having a Shore A at 97; a heat of fusion ($\Delta H_f$) of 56 J/g in the temperature range of from 28 to 117° C. with a peak at 100.35° C.

Engage 8100 is an ethylene-octene copolymer having a Shore A at 73; a heat of fusion ($\Delta H_f$) of 36 J/g in the temperature range of from 32 to 90° C. with a peak at 40 and at 74° C.).

LMP wax is a microcrystalline wax from Shell having a heat of fusion ($\Delta Hf$) of 156 J/g in the temperature range of from 12 to 75° C. (peak 48° C.).

MMP wax is a microcrystalline wax from Shell having a heat of fusion ($\Delta Hf$) of 158 J/g in the temperature range of from 17 to 85° C. (peak 49.6° C.).

HMP wax is a microcrystalline wax from Shell having a heat of fusion ($\Delta Hf$) of 232.8 J/g in the temperature range of from 30 to 95° C. (peak 77.3° C.).

wherein:
the heat of fusion ($\Delta H_f$) is determined by DSC, with a "DSC1 STARe System" from Mettler Toledo, wherein the polyolefin, the processing additive or the compounded backing layer composition first is stored on a metallic cooled plate at 14° C. during 48 hours and subsequently cooled down, at gradient of 10° C./minute, to a temperature of 0° C. After 5 minutes at 0° C. the heat of fusion is determined by heating the samples, at a heating gradient of 10° C./minute, to a temperature of 170° C.

For the particular case of an irregular baseline around 10° C., samples are cooled down to a temperature of −10 or −20° C. and DSC measurements are started from thereon, thus ensuring an unaffected and reproducible fusion heat value.

For the particular case where there is heat flux is beyond 170° C., DSC is recorded till a temperature of 10 to 20° beyond 170° C., and heat of fusion values are obtained from integrating the heat flux from 10° C. till the temperature where there is no more heat flux. The volume of samples is in the range of from 5 to 10μ liter corresponding to approximatively 5 to 25 mg;

the Shore A hardness—is measured on the polyolefin or polyolefin blend, after melting and cooling to 23° C. at 10° C./min. and conditioning for 48 hours at 23° C.;

In tables 1 and 2 the influence of the filler content, Shore A hardness of the polyolefin and additive addition is illustrated.

In table 3 the influence of filler content and particle size is illustrated (examples 11 to 18). Example 12 is represented by way of comparison.

In table 4 a blend of polyolefins at high filler concentration is illustrated in examples 19 to 22. In the same table, examples 23 to 25 illustrate a polyolefin blend wherein one of the polyolefins (Engage 8100) has a copolymerized ethene weight percentage which is 62. In a mixture with Vistamaxx 8880 having a copolymerized ethene weight percentage of 6, the polymer blends are characterized by:
an ethene percentage of 40 and a Shore A hardness of 80 for example 23,
an ethene percentage of 34 and a Shore A hardness of 85 for example 24 and 25.

Further, examples 24 and 25 illustrate carpet backing compositions comprising high weight percentages of additives.

Example 9 illustrates the influence of using wax as such, i.e. not in combination with oil(s) and/or tackifier(s).

Example 26 illustrates the influence of using tackifier as such, i.e. not in combination with oil(s) and/or wax(es).

Example 27

Dimensional changes were evaluated for straight stitch loop level 500×500 mm square test tiles wherein:
the weight of the tufted nylon yarns is 900 g/m² with a tuft density is 12 needles per inch; and,
the backing layer has a density of 2200 g/m² and a thickness of 1.5 mm, the thickness is an indicative value as the weight needed is required.

The carpet test tiles first were conditioned for 100 hours at a temperature of 10° C. and a relative humidity of 25%. The dimensional stability test was performed by installing 25 square carpet test tiles with 50 cm side in a 6.25 m² square with 2.5 m side, wherein the first side of the 6.25 m² square consists of 5 carpet test tiles in the machine direction while the second side of the 6.25 m² square, forming a right angle with the first side, consists of 5 carpet test tiles in the cross direction. The 6.25 m² square was further filled with strips of tiles, in the machine direction, parallel to the first side corresponding to parallel strips of tiles in the cross direction, parallel with the second side. The tiles contacting each other, side by side, were blocked at the edges of the 6.25 m² square, ensuring that each dimensional variation of the individual tiles implies internal stresses that become visible through doming or curling Subsequently the test panels were subjected for 80 hours at a temperature of 40° C. and a relative humidity of 65%, whereupon curling was measured.

The carpet test tiles comprising a backing layer with a $(100 \times \Delta H^{10 \rightarrow 40° C.}/\Delta H^{10 \rightarrow 170° C.})$ value of less than 12.5%, show an acceptable dimensional change, i.e. less than 1 mm lifting at the edges of the tile.

The inventors further have observed that for a backing layer composition with:
a $(100 \times \Delta H^{10 \rightarrow 40° C.}/\Delta H^{10 \rightarrow 170° C.})$ value of less than 5% no lifting at the edges of the tiles is observed;
a $(100 \times \Delta H^{10 \rightarrow 40° C.}/\Delta H^{10 \rightarrow 170° C.})$ value comprised between 5 and less than 10%, lifting at the edges between 0 and less than 0.5 mm is observed;

a ($100 \times \Delta H^{10 \to 40° C.}/\Delta H^{10 \to 170° C.}$) value comprised between 10 and less than 12.5%, a lifting at the edges between 0.5 and less than 1 mm is observed.

The carpet test tiles comprising the backing layer with a ($100 \times \Delta H^{10 \to 40° C.}/\Delta H^{10 \to 170° C.}$) value of 12.5% or more, as in examples 9 and 26, which are comparative examples, show an unacceptable dimensional change, i.e. a lifting at the edges of the tile between 1 mm and less than 2 mm for example 9 and between 2 mm and less than 7 mm for example 26.

The inventors have observed that the heat of fusion of each ingredient (filler included) may be strongly influenced by presence of the other ingredients of the carpet backing layer composition; the thermal properties has to be measured on the completed carpet backing layer composition.

The carpet test tiles comprising the backing layer according to the invention prove to have sufficient stiffness for showing an outstanding dimensional stability under varying temperature and/or humidity conditions.

The invention claimed is:

1. A carpet backing layer composition comprising:
   between at least 10% by weight and 50% by weight or less of a semi-crystalline polyolefin or of a blend of two or more semi-crystalline polyolefin(s) wherein said polyolefin or blend of polyolefins has a weight percentage of (co)polymerized C2 olefin of less than 50 and the weight percentage of (co)polymerized C3-C8 alfa olefins is 50 or more and
   50% to 90% by weight of one or more inorganic filler(s) having a volume median particle diameter (D50) of 10 μm to 1000 μm as obtained from laser light scattering measurements according to ISO 13320;
   the backing layer composition having a heat of fusion within the temperature range of from 10 to 40° C. ($\Delta H^{10 \to 40° C.}$) of less than 12.5% of the heat of fusion of the backing layer composition within the temperature range of from 10 to 170° C. ($\Delta H^{10 \to 170° C.}$), the heat of fusion being measured by Differential Scanning Calorimetry.

2. The carpet backing layer composition according to claim 1, wherein the polyolefin or blend of polyolefins has a Shore A hardness, according to ASTM D 2240 of at least 65.

3. The carpet backing layer composition according to claim 1, wherein the C3-C8 alpha-olefin of the one or more polyolefin(s) is propene, 1-butene, 1-octene or a combination thereof.

4. The carpet backing layer composition according to claim 1, wherein the polyolefin is selected from the group consisting of polypropylene, poly-1-butene, propene-ethene copolymer, propene-1-butene copolymer, 1-butene-ethene copolymer propene-1-butene-ethene copolymer and 1-octene-ethene copolymer.

5. The carpet backing layer composition according to claim 1, wherein the inorganic filler is selected from the group consisting of talc, mica, calcium carbonate, magnesium carbonate, dolomite, barite, bauxite, magnesium hydroxide, aluminium hydroxide, kaolin, silica, glass, and any combination thereof.

6. The carpet backing layer composition according to claim 1, comprising one or more processing additives selected from the group consisting of waxes, oils and tackifiers.

7. The carpet backing layer composition according to claim 6, wherein the processing additives substitute 80% by weight or less of the polyolefin part or of the blend of polyolefins part.

8. The carpet backing layer composition according to claim 6, wherein the processing additives substitute 45% by weight or less of the polyolefin part or of the blend of polyolefins part.

9. The carpet backing layer composition according to claim 1, having a melt viscosity at 160° C. in a rotational viscometer, according to ISO 11443, of from 10 Pas to 5000 Pas.

10. A carpet comprising the carpet backing layer composition of claim 1.

11. The carpet according to claim 10, wherein the carpet backing layer has a surface density comprised between 1600 and 4000 g/m² and a layer thickness comprised between 0.4 and 4.0 mm.

12. A method of making a carpet, comprising:
   a) extrusion coating the carpet backing layer composition, according to claim 1, on the back side of a primary backing material, said primary backing material having a face and a back side, a plurality of fibers attached to the primary backing material and extending from the face side and exposed at the back side and
   b) cooling down the carpet layer composition and forming the carpet backing layer.

13. The method according to claim 12, wherein the extrusion coating is performed at a temperature comprised between 130 and 170° C.

14. The method according to claim 12, further comprising the additional step of subjecting the extrusion coated carpet backing layer composition of step a) to a subsequent heat treatment at a temperature comprised between 130 and 170° C. for a time period comprised between 1 and 60 s before cooling down in step b).

* * * * *